United States Patent
Bucourt et al.

[15] 3,679,718
[45] July 25, 1972

[54] NOVEL 7α-METHYL-Δ$^{4,11}$-GONADIENES

[72] Inventors: Robert Bucourt; Lucien Nedelec, both of Clichy-sous-Bois; Jean-Claude Gasc, Bondy, all of France

[73] Assignee: Roussel Uclaf, Paris, France

[22] Filed: July 27, 1970

[21] Appl. No.: 58,730

[30] Foreign Application Priority Data

July 28, 1969 France....................6925701

[52] U.S. Cl. ............260/397.45, 260/239.5, 260/239.55 R, 424/243
[51] Int. Cl. ......................................C07c 169/22
[58] Field of Search...................../Machine Searched Steroids

[56] References Cited

UNITED STATES PATENTS 3,424,745  1/1969  Joly et al.............................260/239.5

*Primary Examiner*—Henry A. French
*Attorney*—Hammond & Littell

[57] ABSTRACT

Novel 7α-methyl-Δ$^{4,11}$-gonadiene of the formula

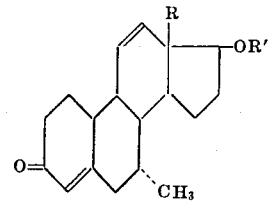

wherein R is alkyl of one to four carbon atoms and R' is selected from the group consisting of hydrogen, acyl of an organic carboxylic acid of one to 18 carbon atoms and an organic ether radical which have anabolic and androgenic activities and their preparation.

4 Claims, No Drawings

NOVEL 7α-METHYL-Δ⁴,¹¹-GONADIENES

OBJECTS OF THE INVENTION

It is an object of the invention to provide the 7α-methyl-Δ⁴,¹¹-gonadienes of formula I.

It is a further object of the invention to provide a novel process for the preparation of the 7α-methyl-Δ⁴,¹¹-gonadienes of formula I.

It is another object of the invention to provide novel therapeutic compositions and a method of inducing anabolic and androgenic activity in warm-blooded animals.

These and other objects and advantages of the invention will become obvious from the following detailed description.

THE INVENTION

The 7α-methyl-Δ⁴,¹¹-gonadienes of the invention have the formula

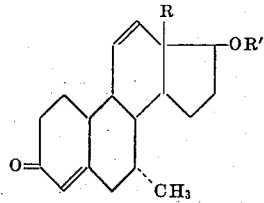

wherein R is alkyl of one to four carbon atoms and R' is selected from the group consisting of hydrogen, acyl of an organic carboxylic acid of one to 18 carbon atoms and an organic ether radical. R is preferably methyl, ethyl, propyl, isopropyl and butyl.

Examples of suitable organic acids of one to 18 carbon atoms may be derived from an aliphatic, aromatic, cycloaliphatic or heterocyclic carboxylic acid. Examples of suitable acids are alkanoic acids, such as formic acid, valeric acid, isovaleric acid, trimethyl acetic acid, caproic acid, β-trimethyl propionic acid, heptanoic acid, caprylic acid, pelargonic acid, capric acid, undecylic acid, lauric acid, myristic acid, palmitic acid and stearic acid; alkenoic acids, such as undecylenic acid and oleic acid, cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclophexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorphenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5-terbutylfurane-2-carboxylic acid, 5-bromo-furane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

For the ethers of formula I, R' is preferably derived from a lower aliphatic alcohol such as methanol, ethanol, propanol, isopropanol, the butanols, the pentanols, allyl alcohol; arylaliphatic alcohols such as benzyl alcohol or heterocyclic alcohols such as tetrahydropyranol.

Among the preferred compounds of formula I are 7α-methyl-17β-acetoxy-Δ⁴,¹¹-estradiene-3-one, 7α'-methyl-17β-benzyloxy-Δ⁴,¹¹-estradiene-3-one, 7α-methyl-17β-propoxy-Δ⁴,¹¹-estradiene-3-one, 7α-methyl-17β-allyloxy-Δ⁴,¹¹-estradiene-3-one, 7α-methyl-13β-ethyl-Δ⁴,¹¹-gonadiene-17β-01-3-one, 7α-methyl-13β-ethyl-17β-acetoxy-Δ⁴,¹¹-gonadiene-3-one, 7α-methyl-13β-ethyl-17β-allyloxy-Δ⁴,¹¹-gonadiene-3-one, 7α-methyl-13β-ethyl-17β-propoxy-Δ⁴,¹¹-gonadiene-3-one, 7α-methyl-13β-ethyl-17β-benzyloxy-Δ⁴,¹¹-gonadiene-3-one, 7α-methyl-13β-ethyl-17β-propionyloxy-Δ⁴,¹¹-gonadiene-3-one, 7α-methyl-13β-ethyl-17β-benzyloxy-Δ⁴,¹¹-gonadiene-3-one, 7α-methyl-13β-propyl-Δ⁴,¹¹-gonadiene-17β-01-3-one, 7α-methyl-13β-propyl-17β-acetoxy-Δ⁴,¹¹-gonadiene-3-one, 7α-methyl-13β-propyl-17β-benzoyloxy-Δ⁴,¹¹-gonadiene-3-one, 7α-methyl-13β-butyl-Δ⁴,¹¹-gonadiene-17β-01-3-one, 7α-methyl-13β-butyl-17βacetoxy-Δ⁴,¹¹-gonadiene-3-one, 7α-methyl-13β-butyl-17β-benzoyloxy-Δ⁴,¹¹-gonadiene-3-one and 7α-methyl-Δ⁴,¹¹-estradiene-17β-01-3-one.

The process of the invention for the preparation of the compounds of formula I wherein R' is hydrogen comprises reacting a 7α-methyl-Δ⁴-gonene of the formula

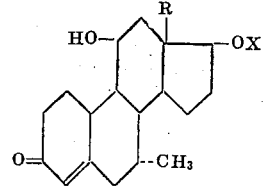

wherein R is alkyl of one to four carbon atoms and X is acyl of an organic carboxylic acid of one to 18 carbons with a dehydrating agent to obtain a mixture of dehydrated products, oxidizing the said mixture with oxygen in the presence of a tertiary amine to form the corresponding hydroperoxy compound, reacting the latter with a reducing agent to reduce the hydroperoxy or treating the said mixture with a strong acid in a protic media to form the corresponding 7α-methyl-13β-R-7β-OX-Δ⁴,¹¹-gonadiene-3-one and saponifying the latter with a basic agent to obtain the 7α-methyl-13β-R-Δ⁴,¹¹-gonadiene-17β01-3-one. This said product can be treated with an esterification agent or an etherification agent.

The raw product produced by treatment with a dehydration agent is a diverse mixture of dienic compounds characterized by their infrared and ultraviolet spectra and their double bonds which may be conjugated [5(10),9(11) or 4,9] or non-conjugated [4,9(11) or 4,11].

The dehydrating agent is preferably N-bromoacetamide in the presence of sulfur dioxide but one may also use thionylchloride and phosphorus oxychloride in the presence of pyridine.

The action of oxygen in the presence of a tertiary base such as triethylamine or pyridine on the mixture of the dehydration products results in the formation of a 11-hydroperoxide and the reduction thereof with a reducing agent such as triethyl phosphite or trimethyl phosphite results in a mixture of 7α-methyl-13β-R-17β-OX-Δ⁴,⁹-gonadiene-11β-01-3-one and 7α-methyl-13β-R-17β-OX-Δ⁴,¹¹-gonadiene-3-one which can be separated by classical techniques such as crystallization or chromatography.

The strong acid is preferably perchloric acid, sulfuric acid, p-toluene sulfonic acid or a cationic sulfonic exchange resin and the protic media is acetic acid or a lower aliphatic alcohol. The action of the strong acid in the protic media on the mixture of dehydrated products results in a mixture of 7α-methyl-13β-R-17β-OX-Δ⁴,⁹-gonadiene-3-one and 7α-methyl-13β-R-17β-OX-Δ⁴,¹¹-gonadiene-3-one and the two compounds can be separated by classical methods.

The saponification of the 7α-methyl-13β-R-17β-OX-Δ⁴,¹¹-gonadiene-3-one may be effected with a basic agent such as methanolic potassium hydroxide to form the corresponding 7α-methyl-13β-R-Δ⁴,¹¹-gonadiene-17β-01-3-one which can be etherified or esterified in the usual manner. For example, the esterification of the 17β-hydroxyl can be effected with a functional acid derivative such as acid chloride or an acid anhydride, preferably in the presence of a tertiary amine. The etherification of the 17β-hydroxyl can be effected with a hydrocarbon halide with an alkali metal derivative of the 17-hydroxyl.

The starting 7α-methyl-13β-R-17β-OX-Δ⁴-gonene-11β-ol-3-one can be prepared by commonly assigned, copending patent application, Ser. No. 58,668 filed on even date herewith which comprises reacting a 13β-R-Δ⁴-gonene-11β,17β-diol-3-one (prepared by French Pat. No., 1,574,693) with an acylating agent or mixture thereof to form the corresponding 3,11β, 17β-triacyloxy-13β-R-Δ³,⁵-gonadiene, selectively brominating in the 6-position with a brominating agent to obtain 6-bromo-11β, 17β-diacyloxy-13β-R-Δ⁴-gonene-3-one, dehydrobrominating the latter with lithium halide in the presence of a basic agent to form 11β, 17β-diacyloxy-13β-R-Δ⁴,⁶-gonadiene-3-one, reacting the latter with an organometallic agent having a methyl group in the presence of a catalyst such as cuprous chloride, then saponifying the incompletely hydrolyzed esters with a base to obtain 7α-methyl-13β-R-Δ⁴-gonene-11β, 17β-diol-3-one which can be esterified in the 17 position by conventional methods.

The anabolic and androgenic compositions of the invention are comprised of an effective amount of at least one compound of formula I and a major amount of a pharmaceutical carrier. The compositions may be in the form of drinkable or injectable suspensions or solutions, of tablets, coated tablets, sublingual tablets, capsules, suppositories, pomades, cremes and topical powders prepared by known methods.

The compositions are useful for the treatment of protidic anabolism troubles, asthenia, thinness, osteosporosis, andropause, senescence, lateness of healing of fractures, metabolic troubles of prolonged corticotherapy, adiposa genital syndrome, meno-metrorrage functions, fibroma, endometriosis, cicatrisation agent for the treatment of various ulcers.

The method of the invention for inducing anabolic or androgenic activity in warm-blooded animals comprises administering to warm-blooded animals an effective amount of at least one compound of formula I. The said compounds may be administered orally, perlingually, transcutaneously, rectally or locally by topical application to skin or mucous. The usual useful daily dose is 0.004 to 0.09 mg/kg.

In the following examples there are described several preferred embodiments to illustrate the invention. However, it should be understood that the invention is not intended to be limited to the specific embodiments.

EXAMPLE I

PREPARATION OF 7α-METHYL-13β-ETHYL-17β-ACETOXY-Δ⁴,¹¹-GONADIENE-3-ONE

Twenty-five gm of 13β-ethyl-Δ⁴-gonene-11β, 17β-diol-3-one (prepared by French Pat. No. 1,574,693) were added under a nitrogen atmosphere to a mixture of 250 cc of acetic acid anhydride, 8.75 cc of acetyl chloride and 8.75 cc of pyridine and the reaction mixture was refluxed for 5 ½ hours. After cooling, the mixture was concentrated to dryness under reduced pressure and the residue was dissolved in 150 cc of a boiling mixture of acetic acid-methanol (8–2). The solution was treated with carbon black, filtered while hot and the filtrate was concentrated to 100 cc and cooled. After crystallization was effected, the mixture was filtered to obtain 25.5 gm of 3,11β, 17β-triacetoxy-13β-ethyl-Δ³,⁵-gonadiene melting at 181°C. Concentration of mother liquor and crystallization from a acetic acid-methanol mixture gave an additional 4.4 gm of the said product melting at 180° C.

U.V. Spectrum (ethanol):
 Max. at 234–235 mμ ε=17,950
IR Spectrum (CCl₄):
 Absorption at 1757 and 1208 cm⁻¹(enolic acetate); at 1738 cm⁻¹ and 1239 cm⁻¹ (acetate at 11 and 17); at 1668 and 1635 cm⁻¹ (double bond).

Step B: 6 ξ- bromo-11β, 17β-diacetoxy-13β-ethyl-Δ⁴-gonene-3-one 133.4 gm of 3,11β, 17β-triacetoxy-13β-ethyl-Δ⁴-gonene were added under a nitrogen atmosphere to a mixture of 450 cc of dimethyl formamide and 7 cc of distilled water and after cooling the mixture to 0° C., 62 gm of N-bromo-succinimide (positive test of amido-iodide paper) were added over 1 hour to obtain 6 ξ -bromo-11β, 17β-diacetoxy-13β-ethyl-Δ⁴-gonene-3-one in solution which was used as is without isolation of the intermediate for the next step.

The pure compound could be isolated if desired by concentration of the reaction mixture, dilution with water, extraction with an organic solvent and concentration to dryness.

Step C: 11β, 17β-diacetoxy-13β-ethyl-Δ⁴,⁶-gonadiene-3-one 33.2 gm of lithium bromide and 66.4 gm of lithium carbonate were added to the solution obtained in Step B and the reaction mixture was heated at 95° C. with stirring for 27 hours. After cooling, the reaction mixture was poured into water, made acidic with acetic acid and was stirred. The precipitate formed was isolated by vacuum filtration and was dried to obtain 120 gm of raw 11β, 17β-diacetoxy-13β-ethyl-Δ⁴,⁶-gonadiene-3-one which was amorphous which was used for the next step. Crystallization from isopropyl ether gave a crystalline product melting at 123°–124° C.

U.V. Spectrum (ethanol):
 Max. at 281–282 mμ ε=23,000
IR Spectrum (CCl₄):
 Absorption at 1659 cm⁻¹ (conjugated ketone); at 1619 and 1585 cm⁻¹ (double bond); and at 1725 cm⁻¹ (nonenolic acetate).

Step D: 7α-methyl-13β-ethyl-Δ⁴-gonene-11β, 17β-diol-3-one 2.8 gm of powdered cuprous chloride were added to 545 cc of a 0.92 M solution of methyl magnesium bromide in tetrahydrofuran and the mixture was stirred for 15 minutes at room temperature and was then cooled to −10° C. Then a solution of 44 gm of 11β, 17β-diacetoxy-13β-ethyl-Δ⁴,⁶-gonadiene-3-one in 290 cc of tetrahydrofuran was progressively added to the reaction mixture and the temperature thereof was returned to 20° C. After stirring for 20 minutes the reaction mixture was poured into a water-hydrochloric acid mixture and the aqueous phase was extracted with methylene chloride. The methylene chloride phase was washed with water, dried and concentrated to dryness. The residue was dissolved in a nitrogen atmosphere in a mixture of 450 cc of methanol and 45 cc of an aqueous 48° B potassium hydroxide solution. The mixture was refluxed for 1 hour, cooled and was poured into water. The pH of the mixture was adjusted to 3.5 with an aqueous hydrochloric acid solution. The aqueous phase was extracted with methylene chloride and the methylene chloride phase was washed with water, dried and concentrated to dryness. The residue was dissolved in methylene chloride and the resulting solution was passed through a column of Florisil (activated magnesium silicate) and was then concentrated to dryness. The dried extract was crystallized from a mixture of methanol and isopropyl ether to obtain 13.9 gm of raw 7α-methyl-13β-ethyl-Δ⁴-gonene-11β, 17β-diol-3-one melting at 246° C. which was used as is for the next step. A sample of the said product was purified by crystallization from methanol and it had a melting point at 248° C.

U.V. Spectrum (ethanol):
 Max. at 244 mμ ε=16,700
RMN Spectrum (deuterochloroform):
 Peaks at 42–48.5 hz (hydrogens of 7-methyl); at 61.5–69-75 hz (hydrogens of 13-ethyl); at 225 hz (hydrogen in 17α); at 252 hz (11α-hydrogen); and at 352.5 hz (hydrogen in 4).

Step E: 7α-methyl-13β-ethyl-17β-acetoxy-Δ⁴-gonene-11β-ol-3-one 23.5 gm of 7α-methyl-13β-ethyl-Δ⁴-gonene-11β, 17β-diol-3-one melting at 246° C. were added under a nitrogen atmosphere to a mixture of 590 cc of acetic acid and 23.5 cc of an aqueous solution of 53° B of perchloric acid and the reaction mixture was stirred for 5 hours at room temperature and was then extracted with methylene chloride and the methylene chloride extract was washed successively with water, an aqueous sodium bicarbonate solution and with water, was dried and concentrated to dryness. The residue was purified by chromatography over silica gel with elution with a 8–2 chloroform-acetone mixture and crystallization from isopropyl ether to obtain 19.4 gm of 7α-methyl-13β-ethyl-17β -acetoxy-Δ⁴-gonene-11β-ol-3-one melting at 186° C.

U.V. Spectrum (ethanol):
 Max. at 243 mμ ε=16,900
IR Spectrum (CCl₄):
 Absorption at 1658 cm⁻¹ (ketone); at 1610 cm⁻¹ (double bond); at 1712 cm⁻¹ (acetoxy); and at 3600 cm⁻¹ (hydroxyl).

Step F:

23 gm of 7α-methyl-13β-ethyl-17β-acetoxy-Δ⁴-gonene-11β-ol-3-one were dissolved under a nitrogen atmosphere in 287 cc of pyridine and after 13.1 gm of bromoacetamide were added thereto, the reaction mixture was stirred for 15 minutes at room temperature. The mixture was cooled to 0° C. and sulfur dioxide was bubbled through the reaction mixture until the amido-iodide paper test was negative and the reaction mixture was then poured into a water-ice mixture. The aqueous phase was extracted with methylene chloride and the methylene chloride phase was washed with an aqueous hydrochloric acid solution, then with water, was dried and concentrated to dryness to obtain 21.6 gm of raw dehydrated product.

The 21.6 gm of raw dehydrated product were dissolved in 540 cc of ethanol containing 1 percent triethylamine and a current of oxygen was bubbled through the solution for 6 hours after which the reaction mixture was evaporated to dryness under reduced pressure. The dried residue was dissolved under a nitrogen atmosphere in 192 cc of ethanol and 17.4 cc of triethyl phosphite were added to the solution which was then refluxed for 2 hours and cooled. Excess reducing agent was destroyed by sufficient amount of oxygenated water to obtain a positive amido-iodide paper test and the reaction mixture was diluted with water and extracted with methylene chloride. The methylene chloride extracts were concentrated to dryness and the residue was purified by chromatography over silica gel with elution a 3-1 mixture of ethyl ether and petroleum ether (B.p.=65°–70° C.) The first fraction consisted of 3.52 gm of raw 7α-methyl-13β-ethyl-17β-acetoxy-Δ⁴,¹¹-gonadiene-3-one and the following fraction consisted of 7α-methyl-13β-ethyl-17β-acetoxy-Δ⁴,⁹-gonadiene-11β-ol-3-one.

The first product was purified by empasting with petroleum ether (B.p.—35°–70° C.) and crystallization from isopropyl ether whereby the said product melted at 144° C. and had a specific rotation $[\alpha]_D = +69.5°$ C. (C=0.55 percent in chloroform).

U.V. Spectrum (ethanol):
  Max. at 239 mμ ε=16,900
RMN Spectrum (deuterochloroform):
  VTMS at 60 M hz peaks at 46–52 hz (hydrogens of 7-methyl); at 58–64 hz (hydrogens of 13-ethyl); at 124 hz (methyl hydrogen of 17 acetoxy); at 288 hz (17α-hydrogen); at 337–347 354–364 hz (hydrogens in 11 and 12); and at 350 hz (4-hydrogen).

7α-methyl-13β-ethyl-17β-acetoxy-Δ⁴,¹¹-gonadiene-3-one was saponified with methanolic potassium hydroxide to obtain 7α-methyl-3β-ethyl-Δ⁴,¹¹-gonadiene-17β-ol-3-one.

The two said Δ⁴,¹¹-gonadiene compounds are not described in the literature as far as is known.

EXAMPLE II

PREPARATION OF 7α-METHYL-13β-ETHYL-17β-ACETOXY-Δ⁴,¹¹-GONADIENE-3-ONE

After repeating the dehydration of Step F of Example I, the 21.6 gm of raw dehydration product were dissolved in a mixture of 216 cc of acetic acid and 21.6 cc of aqueous 55° B perchloric acid solution and the reaction mixture was stirred for 40 minutes at room temperature. The reaction mixture was then added to a mixture of an aqueous saturated sodium bicarbonate solution and ether and the ether phase was decanted off. The aqueous phase was extracted with ethyl ether and the ether phases were combined, were washed with water, were dried and concentrated to dryness to obtain 19.1 gm of an amphorous resin. The resin was subject to chromatography over silica gel and elution with a 3-1 mixture of ethyl ether-petroleum ether (B.p.=65°–75° C.) to obtain a 1.69 gm of 7α-methyl 13β-ethyl-17β-acetoxy-Δ⁴,¹¹-gonadiene-3-one which was identical to the product of Example I.

The other part of the same chromatography gave a homogenous fraction of 7α-methyl-13β-ethyl-17β-acetoxy-Δ⁴,⁹-gonadiene-3-one.

PHARMACOLOGICAL DATA

ANDROGENIC AND ANABOLIC ACTIVITY

The test used was a slightly modified form of the Hershberger test [Proc. Soc. Exp. Biol. Med. Vol. 83 (1953) p. 175]. Castrated male rats 3 ½ weeks old were treated the day after castration for 10 days except for the sixth day and they were sacrificed on the 11th day, 22 to 26 hours after the last administration. The animals were autopsied and the interesting organs were removed and weighed. The levator ani was examined for anabolic activity and the seminal vesicules and ventral prostate were examined for androgenic activity. The test compound was administered subcutaneously in solution in olive oil containing 5 percent benzyl alcohol at daily doses of 10 and 100γ and of 2,10 and 50 γ. The results are shown in Table I.

TABLE I

| Groups | Daily Dose in | Fresh Levator Ani in mg. | Seminal Vesicules in mg. | Prostate in mg. |
|---|---|---|---|---|
| Control 0 | | 27.0 | 6.3 | 10.3 |
| 7α-methyl-13β-ethyl- 10 | | 52.9 | 42.3 | 61.4 |
| 17β-acetoxy-Δ⁴,¹¹- gonadiene-3-one 100 | | 72.1 | 190.7 | 161.9 |
| Control 0 | | 21.9 | 8.7 | 6.9 |
| 7α-methyl-13β-ethyl- 2 | | 39.9 | 23.6 | 11.7 |
| 17β-acetoxy-Δ⁴,¹¹- 10 | | 64.2 | 79.0 | 48.7 |
| gonadiene-3-one 50 | | 75.7 | 158.9 | 237.3 |

The results of Table I clearly show the high anabolic and androgenic activity of 7α-methyl-13β-ethyl-17β-acetoxy-Δ⁴,¹¹-gonadiene-3-one.

Various modifications of the compositions and method of the invention may be made without departing from the spirit or scope thereof and it is to be understood that the invention is to be limited only as defined in the appended claims.

We claim:
1. A 7α-methyl-Δ⁴,¹¹-gonadiene of the formula

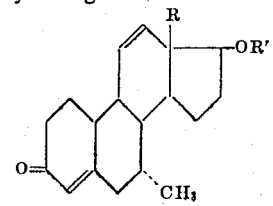

wherein R is alkyl of one to four carbon atoms and R' is selected from the group consisting of hydrogen, acyl of an organic carboxylic acid of one to 18 carbon atoms and an organic radical selected from the group consisting of lower alkyl, allyl, benzyl and tetrahydropyranyl.

2. A compound of claim 1 which is 7α-methyl-13β-ethyl-17β-acetoxy-Δ⁴,¹¹-gonadiene-3-one.

3. A compound of claim 1 which is 7α-methyl-13β-ethyl-Δ⁴,¹¹-gonadiene-17β-ol-3-one.

4. A process for the preparation of a compound of claim 1 wherein R' is hydrogen comprising reacting a 7α-methyl-Δ⁴-gonene of the formula

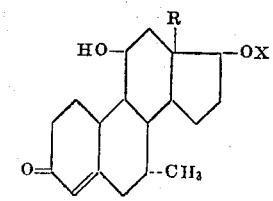

wherein R is alkyl of one to four carbon atoms and X is acyl of an organic carboxylic acid of one to 18 carbons with a dehydrating agent selected from the group consisting of N-bromoacetamide in the presence of sulfur dioxide, phosphorus oxychloride in the presence of pyridine and thionylchloride to obtain a mixture of dehydrated products, oxidizing the said mixture with oxygen with presence of a tertiary amine to form the corresponding N-hydroperoxy compound, treating the latter with a reducing agent selected from the group consisting of trimethyl phosphite and triethyl phosphite to reduce the hydroperoxy or treating the said mixture with a strong acid in a protic media to form the corresponding 7α-methyl-13β-R-17β-OX-$\Delta^{4,11}$-gonadiene-3-one and saponifying the latter with a basic agent to obtain the 7α-methyl-13β-R-$\Delta^{4,11}$-gonadiene-17β-ol-3-one.

* * * * *